United States Patent
Je et al.

(10) Patent No.: US 11,236,460 B2
(45) Date of Patent: Feb. 1, 2022

(54) DRAIN PUMP DRIVING APPARATUS AND LAUNDRY TREATMENT MACHINE INCLUDING THE SAME

(71) Applicant: LG ELECTRONICS INC., Seoul (KR)

(72) Inventors: Jungmoon Je, Seoul (KR); Chungill Lee, Seoul (KR); Kiwook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 47 days.

(21) Appl. No.: 16/094,613

(22) PCT Filed: Apr. 18, 2017

(86) PCT No.: PCT/KR2017/004139
§ 371 (c)(1),
(2) Date: Oct. 18, 2018

(87) PCT Pub. No.: WO2017/183886
PCT Pub. Date: Oct. 26, 2017

(65) Prior Publication Data
US 2019/0127903 A1 May 2, 2019

(30) Foreign Application Priority Data
Apr. 18, 2016 (KR) .................. 10-2016-0047129

(51) Int. Cl.
*D06F 39/08* (2006.01)
*D06F 33/42* (2020.01)
(Continued)

(52) U.S. Cl.
CPC ............ *D06F 39/085* (2013.01); *D06F 33/42* (2020.02); *D06F 37/12* (2013.01); *H02P 21/14* (2013.01);
(Continued)

(58) Field of Classification Search
CPC ...... D06F 39/006; D06F 3/00; D06F 3/30–76; D06F 34/00; D06F 34/14–18;
(Continued)

(56) References Cited

U.S. PATENT DOCUMENTS

2007/0113595 A1* 5/2007 Harwood ............... D06F 39/087
68/12.01
2009/0056756 A1* 3/2009 Son ..................... A47L 15/0049
134/18
(Continued)

FOREIGN PATENT DOCUMENTS

JP 2001-342989 12/2001
JP 2001342989 A * 12/2001
(Continued)

OTHER PUBLICATIONS

Engineering ToolBox, (2003). Pump Affinity Laws, [online] Available at: https://www.engineeringtoolbox.com/affinity-laws-d_408.html [Accessed Sep. 1, 2020], (Year: 2003).*
(Continued)

Primary Examiner — Michael E Barr
Assistant Examiner — Omair Chaudhri
(74) Attorney, Agent, or Firm — Ked & Associates, LLP

(57) ABSTRACT

Disclosed is a drain pump driving apparatus and a laundry treatment machine including the same. The laundry treatment machine includes: a drain pump driving apparatus configured to drive a drain pump, wherein the drain pump driving apparatus includes: a motor to drive the drain pump; an inverter to convert a direct current (DC) power to an alternating current (AC) power by a switching operation, and output the converted AC power to the motor; an output current detector to detect an output current flowing to the motor; and a controller configured to control the inverter, wherein the controller is further configured to calculate a
(Continued)

speed of the motor based on an output current, and calculate a lift, which is a difference between a water level of a water introduction part through which water flows into the drain pump and s water level of a water discharge part for discharging water from the drain pump, based on the calculated speed.

12 Claims, 17 Drawing Sheets

(51) Int. Cl.
　　*H02P 21/18*　　(2016.01)
　　*H02P 21/22*　　(2016.01)
　　*H02P 21/14*　　(2016.01)
　　*H02P 27/12*　　(2006.01)
　　*D06F 103/48*　　(2020.01)
　　*D06F 37/12*　　(2006.01)
　　*D06F 105/46*　　(2020.01)

(52) U.S. Cl.
　　CPC .............. *H02P 21/18* (2016.02); *H02P 21/22* (2016.02); *H02P 27/12* (2013.01); *D06F 2103/48* (2020.02); *D06F 2105/46* (2020.02); *H02P 2201/03* (2013.01); *H02P 2201/15* (2013.01); *Y02B 40/00* (2013.01)

(58) Field of Classification Search
　　CPC ... D06F 37/304–304; D06F 39/08–088; A47L 15/00–508
　　See application file for complete search history.

(56) References Cited

U.S. PATENT DOCUMENTS

| | | | | |
|---|---|---|---|---|
| 2010/0176754 | A1* | 7/2010 | Navarra | A47L 15/46 318/8 |
| 2010/0200019 | A1* | 8/2010 | Prioli | D06F 39/08 134/22.1 |
| 2011/0000558 | A1* | 1/2011 | Harwood | D06F 33/00 137/544 |
| 2012/0005840 | A1* | 1/2012 | Jang | D06F 33/00 8/137 |
| 2014/0000664 | A1* | 1/2014 | Badafem | D06F 39/08 134/57 R |
| 2014/0311192 | A1 | 10/2014 | Chanda et al. | |
| 2017/0302208 | A1* | 10/2017 | Je | D06F 39/085 |

FOREIGN PATENT DOCUMENTS

| | | |
|---|---|---|
| JP | 2004-232606 | 8/2004 |
| JP | 2004232606 A * | 8/2004 |
| KR | 200133050 Y1 * | 10/1998 |
| KR | 20-0133050 | 4/1999 |
| KR | 10-0792676 | 1/2008 |
| KR | 10-2012-0012216 | 2/2012 |

OTHER PUBLICATIONS

European Search Report dated Nov. 25, 2019 issued in Application No. 17786154.9.
Korean Notice of Allowance dated Jun. 30, 2017 issued in Application No. 10-2016-0047129.
International Search Report (with English Translation) and Written Opinion dated Aug. 16, 2017 issued in Application No. PCT/KR2017/004139.

* cited by examiner

DRAIN PUMP DRIVING APPARATUS AND LAUNDRY TREATMENT MACHINE INCLUDING THE SAME

CROSS-REFERENCE TO RELATED PATENT APPLICATIONS

This application is a U.S. National Stage Application under 35 U.S.C. § 371 of PCT Application No. PCT/KR2017/004139, filed Apr. 18, 2017, which claims priority to Korean Patent Application No. 10-2016-0047129, filed Apr. 18, 2016, whose entire disclosures are hereby incorporated by reference.

TECHNICAL FIELD

The present invention relates to a drain pump driving apparatus and a laundry treatment machine including the same and, more particularly, a drain pump driving apparatus capable of accurately calculating a lift without using a water pressure sensor and a water level sensor, and a laundry treatment machine including the same.

BACKGROUND ART

Generally, a laundry treatment machine performs washing by using friction force between laundry and a washing tub that is rotated by a driving force of a motor transmitted thereto with a detergent, wash water and laundry put in a drum. The laundry treatment machine may produce a laundry washing effect with little damage to the laundry and no tangled laundry.

A drain pump is used to drain residual water from the washing tub in the laundry treatment machine, and various methods for stable operation of the drain pump are being discussed.

DISCLOSURE

Technical Problem

An object of the present invention is to provide a drain pump driving apparatus capable of accurately calculating a lift without using a water pressure sensor and a water level sensor, and a laundry treatment machine including the same.

Technical Solution

In order to achieve the above object, the present invention provides a drain pump driving apparatus including: a motor to drive a drain pump; an inverter to convert a direct current (DC) power to an alternating current (AC) power by a switching operation, and output the converted AC power to the motor; an output current detector to detect an output current flowing to the motor; and a controller configured to control the inverter, wherein the controller is further configured to calculate a speed of the motor based on the output current, and calculate a lift, which is a difference between a water level of a water introduction part through which water flows into the drain pump and a water level of a water discharge part for discharging water from the drain pump, based on the calculated speed.

Meanwhile, in order to achieve the above object, the present invention provides a laundry treatment machine including: a washing tub; a driving unit configured to drive the washing tub; a drain pump; and a drain pump driving apparatus configured to drive the drain pump, wherein the drain pump driving apparatus includes: a motor to drive the drain pump; an inverter to convert a direct current (DC) power to an alternating current (AC) power by a switching operation, and output the converted AC power to the motor; an output current detector to detect an output current flowing to the motor; and a controller configured to control the inverter, wherein the controller is further configured to calculate a speed of the motor based on an output current, and calculate a lift, which is a difference between a water level of a water introduction part through which water flows into the drain pump and s water level of a water discharge part for discharging water from the drain pump, based on the calculated speed.

Advantageous Effects

In accordance with an aspect of the present invention, the above and other objects may be accomplished by the provision of a drain pump driving apparatus including a motor to drive the drain pump, an inverter to convert a direct current (DC) power to an alternating current (AC) power by a switching operation and output the converted AC power to the motor, an output current detector to detect an output current flowing to the motor, and a controller configured to control the inverter, wherein the controller may calculate a speed of the motor based on the output current and calculates a lift, which is a difference between the water level of a water introduction part through which water flows into the drain pump and the water level of a water discharge part for discharging water from the drain pump, based on the calculated speed. Accordingly, the lift may be accurately calculated without using any water pressure sensor or water level sensor. Therefore, manufacturing costs may be reduced.

As the rotational speed of the motor is controlled to be varied based on the calculated lift, drainage may be performed smoothly, and power consumption may be reduced.

BEST MODE

Hereinafter, the present invention will be described in more detail with reference to the accompanying drawings.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
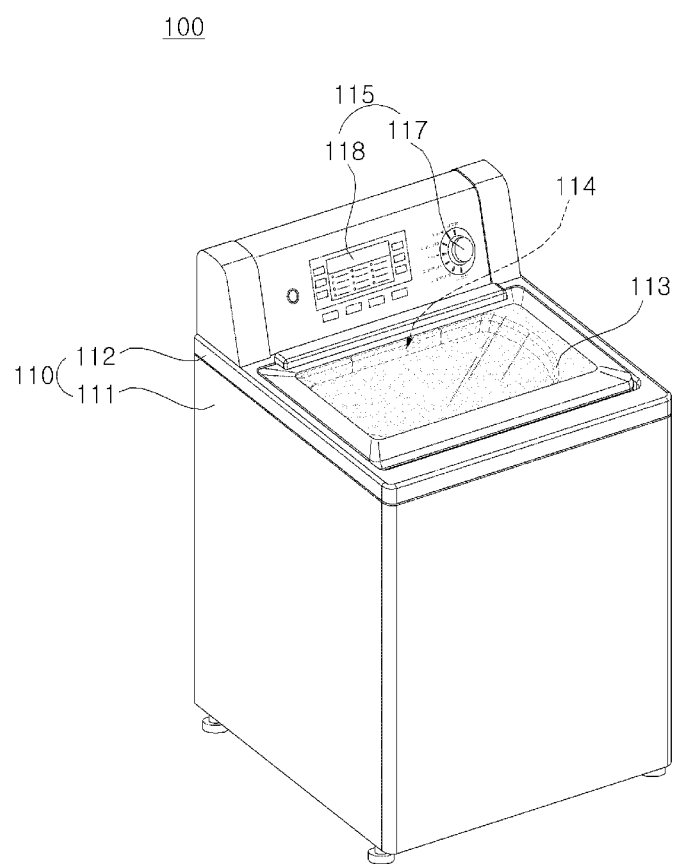
FIG. 1 is a perspective view illustrating a laundry treatment machine according to an embodiment of the present invention.
Figure 2:
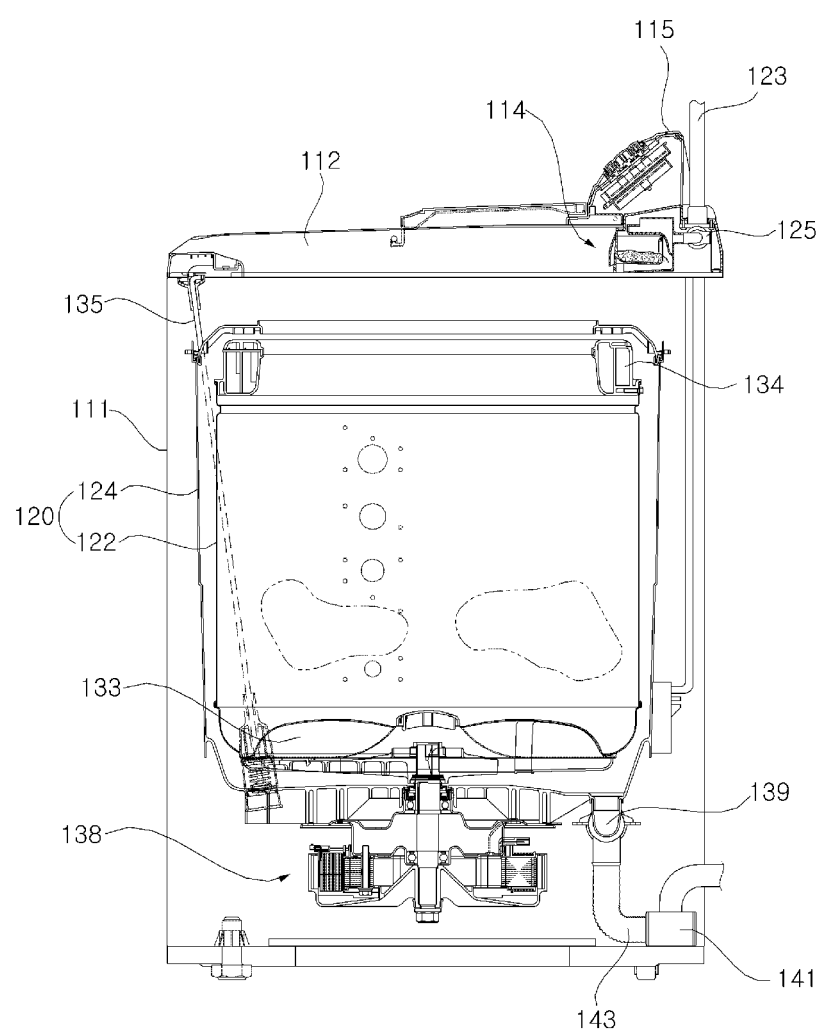
FIG. 2 is a side cross-sectional view illustrating the laundry treatment machine of FIG. 1.

FIG. 1 is a perspective view illustrating a laundry treatment machine according to an embodiment of the present invention, and FIG. 2 is a side cross-sectional view illustrating the laundry treatment machine of FIG. 1.

Referring to FIGS. 1 and 2, the laundry treatment machine 100 according to an embodiment of the present invention conceptually includes a washing machine having fabric inserted therein for performing washing, rinsing and dewatering, or a dryer having wet fabric inserted therein. The washing machine will be mainly described below.

The washing machine 100 includes a casing 110 forming an outer appearance, operation keys for receiving various control commands from a user, and a control panel 115 equipped with a display for displaying information on the operating state of the washing machine 100 to provide a user interface, and a door 113 rotatably installed in the casing 110 to open and close an entrance hole through which the laundry enters and exits.

The casing 110 includes a body 111 for defining a space in which various components of the washing machine 100 may be accommodated and a top cover 112 provided at an upper side of the body 111 and forming a fabric entrance hole to allow the laundry to be introduced into an inner tub 122 therethrough.

The casing 110 is described as including the body 111 and the top cover 112, but the casing 110 is not limited thereto as long as it forms the appearance of the washing machine 100.

Meanwhile, a support rod 135 is coupled to the top cover 112 which is one of the constituent elements of the casing 110. However, the support rod 135 is not limited thereto and may be coupled to any part of the fixed portion of the casing 110.

The control panel 115 includes operation keys 117 for controlling an operation state of the laundry treatment machine 100 and a display 118 disposed on one side of the operation keys 117 to display the operation state of the laundry treatment machine 100.

The door 113 opens and closes a fabric entrance hole (not shown) formed in the top cover 112 and may include a transparent member such as reinforced glass to allow the inside of the body 111 to be seen.

The washing machine 100 may include a washing tub 120. The washing tub 120 may include an outer tub 124 containing wash water and an inner tub 122 rotatably installed in the outer tub 124 to accommodate laundry. A balancer 134 may be provided at the upper portion of the washing tub 120 to compensate for unbalance amount generated when the washing tub 120 rotates.

Meanwhile, the washing machine 100 may include a pulsator 133 rotatably provided at a lower portion of the washing tub 120.

The driving apparatus 138 serves to provide a driving force for rotating the inner tub 122 and/or the pulsator 133. A clutch (not shown) for selectively transmitting the driving force of the driving apparatus 138 may be provided such that only the inner tub 122 is rotated, only the pulsator 133 is rotated, or the inner tub 122 and the pulsator 133 are rotated at the same time.

Figure 3:
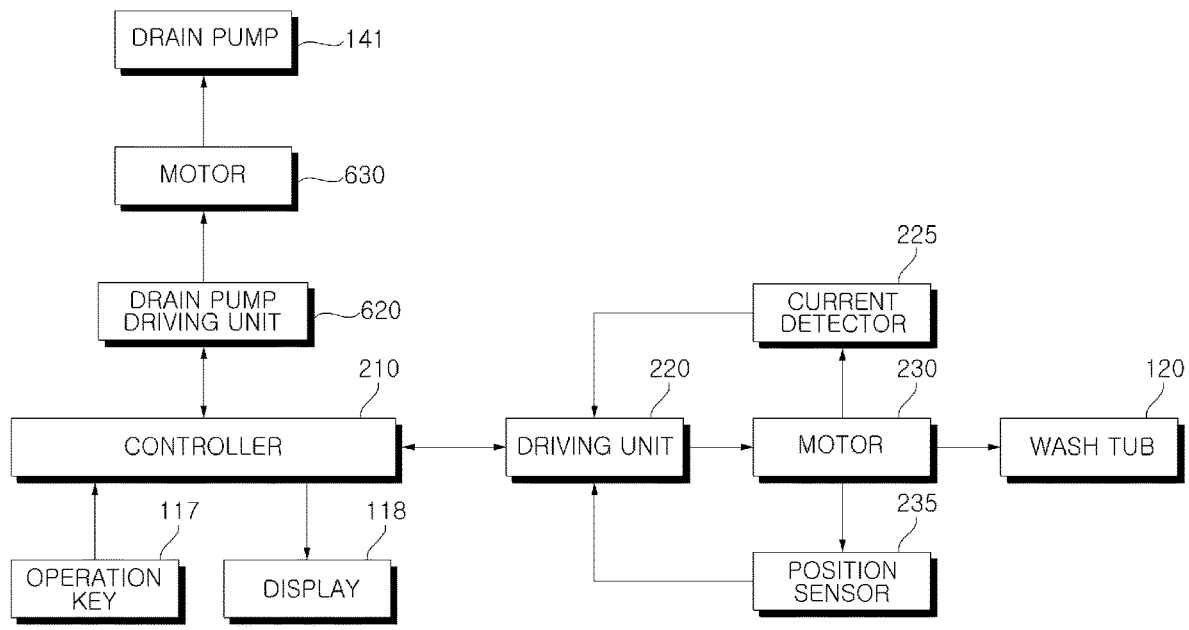
FIG. 3 is an internal block diagram of the laundry treatment machine of FIG. 1.

The driving apparatus 138 is operated by a driving unit 220 of FIG. 3, that is, a driving circuit. This will be described later with reference to FIG. 3 and other drawings.

A detergent box 114 for accommodating various additives such as a laundry detergent, a fabric softener, and/or a bleaching agent is retrievably provided to the top cover 112, and the wash water supplied through a water supply channel 123 flows into the inner tub 122 via the detergent box 114.

A plurality of holes (not shown) is formed in the inner tub 122. Thereby, the wash water supplied to the inner tub 122 flows to the outer tub 124 through the plurality of holes. A water supply valve 125 for regulating the water supply channel 123 may be provided.

The wash water is drained from the outer tub 124 through a drain channel 143, and a drain valve 145 for regulating the drain channel 143 and a drain pump 141 for pumping the wash water may be provided.

The support rod 135 is provided to hang the outer tub 124 in the casing 110, and one end of the support rod 135 is connected to the casing 110 and the other end of the support rod 135 is connected to the outer tub 124 by a suspension 150.

The suspension 150 attenuates vibration of the outer tub 124 during the operation of the washing machine 100. For example, the outer tub 124 may be vibrated by vibration generated as the inner tub 122 rotates. While the inner tub 122 rotates, the vibration caused by various factors such as unbalance laundry amount contained in the inner tub 122, the rotational speed of the inner tub 122 or the resonance characteristics of the inner tub 122 may be attenuated.

FIG. 3 is an internal block diagram of the laundry treatment machine of FIG. 1.

With reference to the drawing, in the laundry treatment machine 100, the driving unit 220 is controlled by the controller 210, and the driving unit 220 drives the motor 230. Thereby, the washing tub 120 is rotated by the motor 230.

Meanwhile, the laundry treatment machine 100 may include a motor 630 for driving the drain pump 141 and a drain pump driving unit 620 for controlling the motor 630. The drain pump driving unit 620 may be controlled by the controller 210.

In this specification, the drain pump driving unit 620 may be referred to as a drain pump driving apparatus 620.

The controller 210 operates according to an operation signal received from an operation key 117. Thereby, washing, rinsing, and dewatering may be performed.

In addition, the controller 210 may control the display 118 to display a wash course, a wash time, a dewatering time, a rinsing time, or a current operation state.

Meanwhile, the controller 210 controls the driving unit 220 to operate the motor 230. For example, based on a current detector 225 for detecting the output current flowing through the motor 230 and a position sensor 235 for sensing the position of the motor 230, the controller 210 may control the driving unit 220 to rotate the motor 230. While the detected current and the sensed position signal are illustrated in FIG. 3 as being input to the driving unit 220, embodiments of the present invention are not limited thereto, and the detected current and the sensed position signal may be applied to either the controller 210 or the controller 210 and the driving unit 220.

The driving unit 220, which serves to drive the motor 230, may include an inverter (not shown) and an inverter controller (not shown). Further, the driving unit 220 may further include a converter or the like for supplying DC power input to the inverter (not shown).

For example, when the inverter controller (not shown) outputs a switching control signal (Sic in FIG. 5) of a pulse width modulation (PWM) scheme to the inverter (not shown), the inverter (not shown) may supply AC power of a predetermined frequency to the motor 230 through high-speed switching.

Meanwhile, the controller 210 may calculate the laundry amount based on the current io detected by the current detector 225 or the position signal H sensed by the position sensor 235. For example, while the washing tub 120 rotates, the laundry amount may be calculated based on the current value io of the motor 230.

Meanwhile, the controller 210 may calculate the unbalance amount of the washing tub 120, that is, the unbalance (UB) of the washing tub 120. Such unbalance amount calculation may be performed based on the ripple component of the current io detected by the current detector 225 or the amount of change in rotational speed of the washing tub 120.

Figure 4:
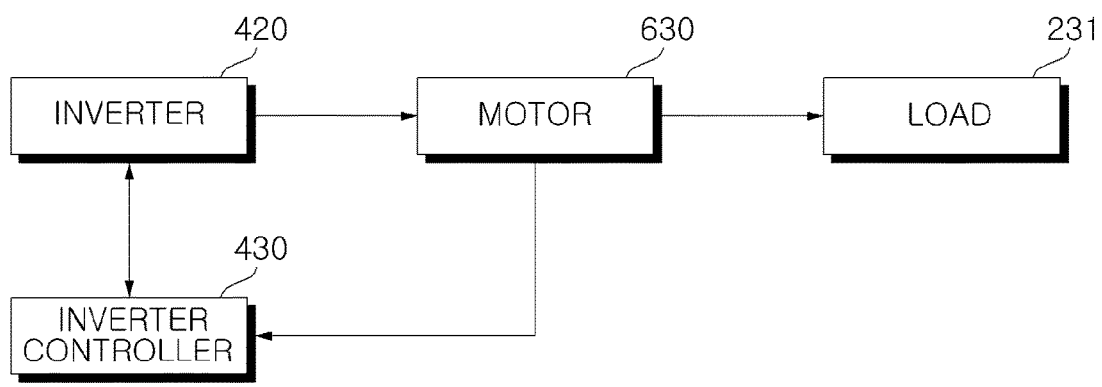
FIG. 4 is an exemplary internal block diagram of the drain pump driving apparatus of FIG. 1.
Figure 5:
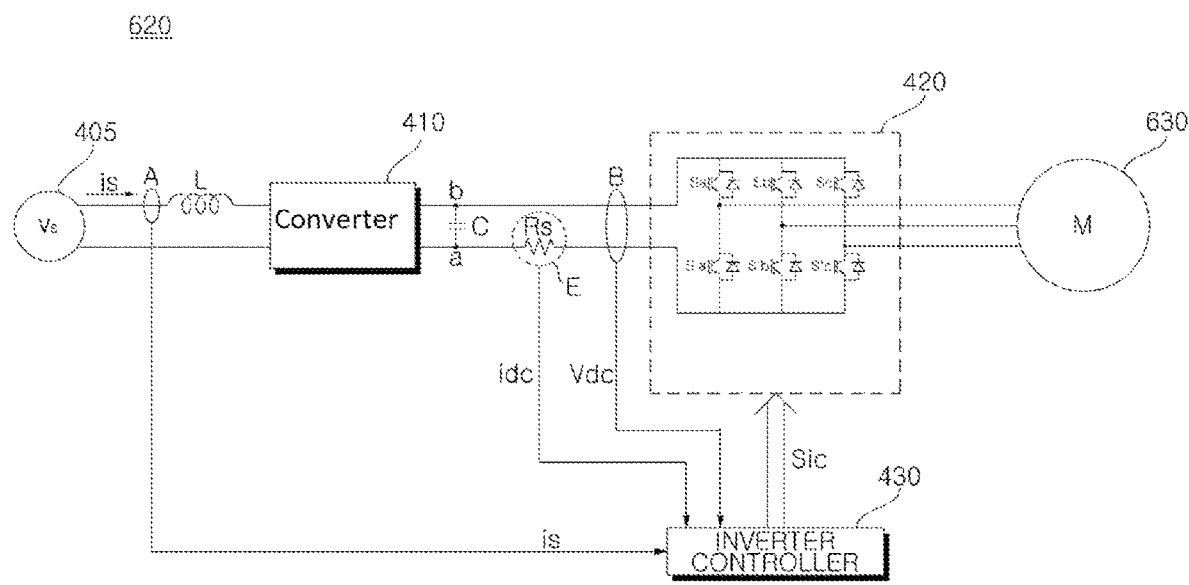
FIG. 5 is an exemplary internal circuit diagram of the drain pump driving apparatus of FIG. 4.

FIG. 4 is an exemplary internal block diagram of the drain pump driving apparatus of FIG. 1, and FIG. 5 is an exemplary internal circuit diagram of the drain pump driving apparatus of FIG. 4.

With reference to the drawings, the drain pump driving apparatus 620 according to an embodiment serves to drive the motor 630 in a sensorless manner, and includes an inverter 420 and an inverter controller 430.

According to an embodiment, the drain pump driving apparatus 620 may include a converter 410, a DC terminal voltage detector B, a smoothing capacitor C, and an output current detector E. The drain pump driving apparatus 620 may further include an input current detector A and a reactor L.

Hereinafter, the operation of each constituent unit in the drain pump driving apparatus 620 of FIGS. 4 and 5 will be described.

The reactor L is disposed between a commercial AC power source 405 and the converter 410, and performs a power factor correction operation or a boost operation. The reactor L may also function to limit the harmonic current resulting from high-speed switching of the converter 410.

The input current detector A may detect an input current is input from the commercial AC power source 405. To this end, a current transformer (CT), a shunt resistor, or the like may be used as the input current detector A. The detected input current may be input to the inverter controller 430 as a discrete signal in the form of a pulse.

The converter 410 converts the commercial AC power 405 having passed through the reactor L into DC power and outputs the DC power. Although the commercial AC power source 405 is shown as a single-phase AC power source in FIG. 5, it may be a 3-phase AC power source. The internal structure of the converter 410 depends on the type of the commercial AC power source 405.

Meanwhile, the converter 410 may be configured with diodes or the like without a switching device, and may perform a rectification operation without a separate switching operation.

For example, in the case of a single-phase AC power source, four diodes may be used in the form of a bridge. In the case of a 3-phase AC power source, six diodes may be used in the form of a bridge.

Meanwhile, a half-bridge type converter having two switching devices and four diodes connected to each other may be used as the converter 410, and, in the case of a 3-phase AC power source, six switching devices and six diodes may be used.

When the converter 410 is provided with a switching device, the boost operation, the power factor correction, and the DC power conversion may be performed by the switching operation of the switching device.

The smoothing capacitor C smooths the input power and stores the same. In FIG. 5, one element is exemplified as the smoothing capacitor C, but a plurality of elements may be provided to secure element stability.

While the smoothing capacitor C is illustrated in FIG. 5 as being connected to the output terminal of the converter 410, embodiments of the present invention are not limited thereto and the DC power may be input directly to the smoothing capacitor C. For example, the DC power from a solar cell may be input directly to the smoothing capacitor C or may be DC-to-DC converted and input to the smoothing capacitor C. Hereinafter, the parts illustrated in the drawings will be mainly described.

Meanwhile, both ends of the smoothing capacitor C are referred to as DC terminals or DC links because the DC power is stored.

The DC terminal voltage detector B may detect the DC terminal voltage Vdc between both ends of the smoothing capacitor C. To this end, the DC terminal voltage detector B may include a resistance element and an amplifier. The detected DC terminal voltage Vdc may be input to the inverter controller 430 as a discrete signal in the form of a pulse.

The inverter 420 may include a plurality of inverter switching devices, and may convert the smoothed DC power Vdc into 3-phase AC powers va, vb and vc having predetermined frequencies by the on/off operation of the switching device, and output the same to a 3-phase synchronous motor 630.

The inverter 420 includes upper switching devices Sa, Sb and Sc and lower switching devices S'a, S'b and S'c, wherein each of the upper switching devices Sa, Sb, Sc and a corresponding lower switching device S'a, S'b, S'c are connected in series to form a pair and three pairs of upper and lower switching devices Sa and S'a, Sb and S'b, and Sc and S'c are connected in parallel. Each of the switching devices Sa, S'a, Sb, S'b, Sc and S'c is connected with a diode in anti-parallel.

Each of the switching devices in the inverter 420 is turned on/off based on an inverter switching control signal Sic from the inverter controller 430. Thereby, 3-phase AC power having a predetermined frequency is output to the 3-phase synchronous motor 630.

The inverter controller 430 may control the switching operation of the inverter 420 in a sensorless manner. To this end, the inverter controller 430 may receive an output current idc detected by the output current detector E.

In order to control the switching operation of the inverter 420, the inverter controller 430 outputs the inverter switching control signal Sic to the inverter 420. The inverter switching control signal Sic is a pulse width modulated (PWM) switching control signal. The inverter switching control signal Sic is generated and output based on the output current idc detected by the output current detector E. The operation of outputting the inverter switching control signal Sic from the inverter controller 430 will be described in detail with reference to FIG. 6 later in this specification.

The output current detector E may detect the output current idc flowing between the inverter and the 3-phase motor 630.

The output current detector E may be disposed between a DC terminal capacitor C and the inverter 420 to detect an output current flowing to the motor.

In particular, the output current detector E may include one shunt resistance element Rs.

The output current detector E may use one shunt resistor element Rs to detect a phase current which is the output current idc flowing to the motor 630 in time division manner when the lower switching devices of the inverter 420 are turned on.

The detected output current idc, which is a discrete signal in the form of a pulse, may be applied to the inverter controller 430, and the inverter switching control signal Sic is generated based on the detected output current idc. Hereinafter, it is assumed that the detected output current idc includes 3-phase output currents ia, ib and ic.

Meanwhile, the 3-phase motor 630 includes a stator and a rotor, and the rotor rotates when the AC power of each phase of a predetermined frequency is applied to the coil of a corresponding phase (of phases a, b and c) of the stator.

Such motor 630 may include a brushless DC (BLDC) motor.

The motor 630 may include, for example, a Surface-Mounted Permanent-Magnet Synchronous Motor (SMPMSM), an Interior Permanent Magnet Synchronous Motor (IPMSM), and a Synchronous Reluctance Motor (SynRM). The SMPMSM and the IPMSM are Permanent Magnet Synchronous Motors (PMSM) employing permanent magnets, while the SynRM does not have a permanent magnet.

Figure 6:
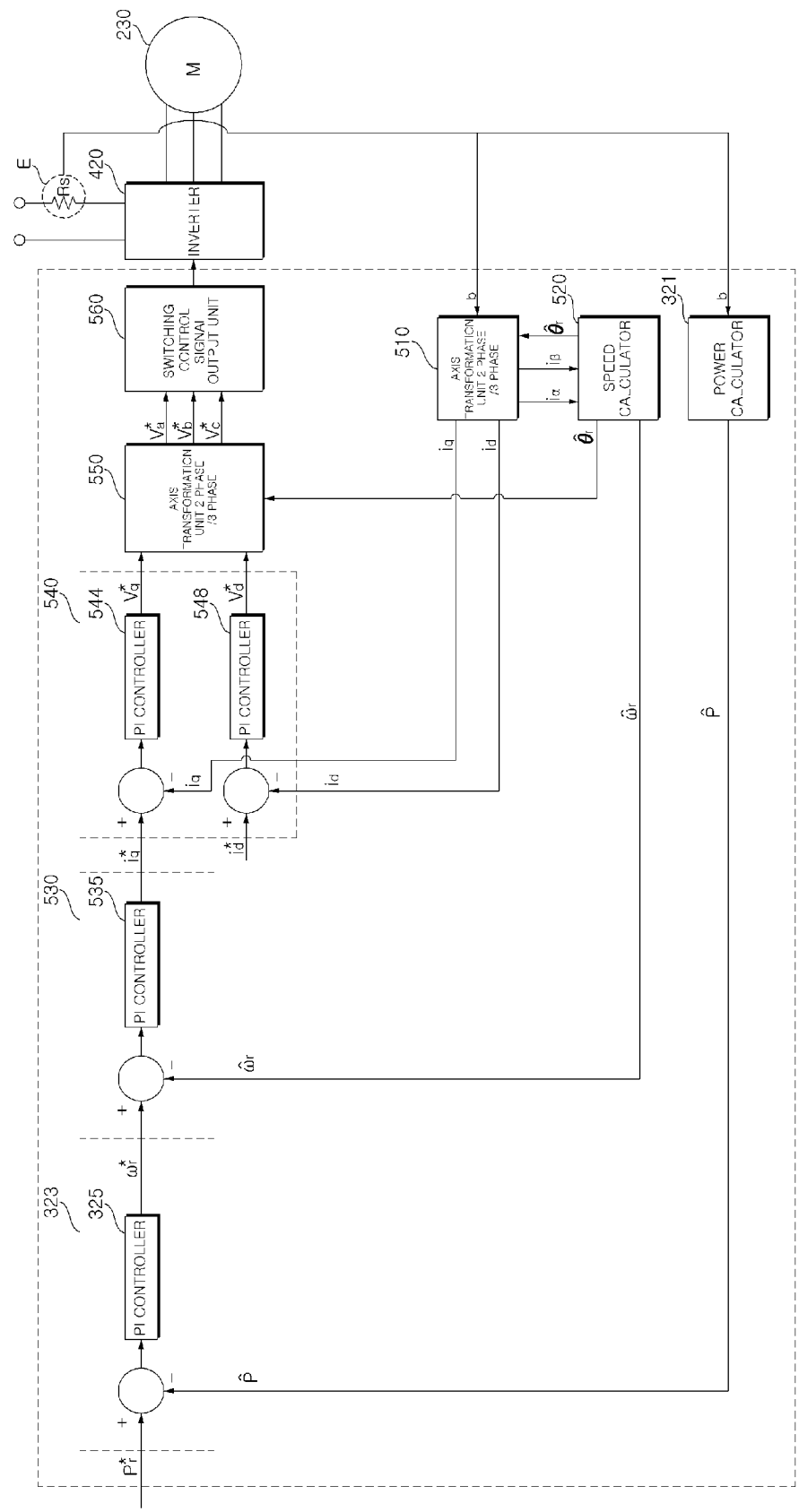
FIG. 6 is an internal block diagram of the inverter controller of FIG. 5.

FIG. 6 is an internal block diagram of the inverter controller of FIG. 5.

Referring to FIG. 6, the inverter controller 430 may include an axis transformation unit 510, a speed calculator 520, a power calculator 321, a speed command generator 323, a current command generator 530, a voltage command generator 540, an axis transformation unit 550, and a switching control signal output unit 560.

The axis transformation unit 510 may extract the respective phase currents ia, ib and ic from the output current idc detected by the output current detector E and transform the extracted phase currents ia, ib and ic, into 2-phase currents (iα, iβ) in the stationary coordinate system.

The axis transformation unit 510 may transform the 2-phase currents (iα, iβ) of the stationary coordinate system into 2-phase current (id, iq) of the rotating coordinate system.

The speed calculator 520 may estimate the position $\hat{\theta}_r$ based on the output current idc detected by the output current detector E and calculate the speed $\hat{\omega}_r$ by differentiating the estimated position.

The power calculator 321 may calculate the power or load of the motor 630 based on the output current idc detected by the output current detector E.

The speed command generator 323 generates a speed command value ω*r based on the power P calculated by the power calculator 321 and a power command value P*r. For example, the speed command generator 323 may perform PI control in the PI controller 325 based on the difference between the calculated power P and the power command value P*r, and generate a speed command value ω*r.

The current command generator 530 generates a current command value i*q based on the calculated speed $\hat{\omega}_r$ and a speed command value ω*r. For example, the current command generator 530 may perform PI control in a PI controller 535 and generate the current command value i*q based on the difference between the calculated speed $\hat{\omega}_r$, and the speed command value ω*r. While FIG. 6 illustrates a q-axis current command value i*q as a current command value, a d-axis current command value i*d may also be generated. The d-axis current command value i*d may be set to 0.

The current command generator 530 may further include a limiter (not shown) for limiting the level of the current command value i*q such that the current command value i*q does not exceed an allowable range.

Next, the voltage command generator 540 generates d-axis and q-axis voltage command values v*d and v*q based on the d-axis and q-axis currents id and iq which are transformed into currents in the 2-phase rotating coordinate system by the axis transformation unit and the current command values i*d and i*q from the current command generator 530. For example, the voltage command generator 540 may perform PI control in a PI controller 544 and generate a q-axis voltage command value v*d based on the difference between the q-axis current iq and the q-axis current command value i*q. In addition, the voltage command generator 540 may perform PI control in a PI controller 548 and generate the d-axis voltage command value v*d based on the difference between the d-axis current id and the d-axis current command value i*d. The voltage command generator 540 may further include a limiter (not shown) for limiting the levels of the d-axis and q-axis voltage command values v*d and v*q such that the d-axis and q-axis voltage command values v*d and v*q do not exceed an allowable range.

Meanwhile, the generated d-axis and q-axis voltage command values v*d and v*q are input to the axis transformation unit 550.

The axis transformation unit 550 receives the position $\hat{\theta}_r$ calculated by the speed calculator 520 and the d-axis and q-axis voltage command values v*d and v*q, and performs coordinate system transformation.

First, the axis transformation unit 550 transforms a 2-phase rotating coordinate system into a 2-phase stationary coordinate system. The transformation may be performed using the position $\hat{\theta}_r$ calculated by the speed calculator 520.

In addition, the axis transformation unit 550 may also transform the 2-phase stationary coordinate system into the 3-phase stationary coordinate system. Through such transformation, the axis transformation unit 550 outputs 3-phase output voltage command values v*a, v*b, and v*c.

The switching control signal output unit 560 outputs a PWM inverter switching control signal Sic based on the 3-phase output voltage command values v*a, v*b, and v*c.

The output inverter switching control signal Sic is transformed into a gate drive signal in a gate driving unit (not shown) and is then input to the gate of each switching device in the inverter 420. Thereby, the switching devices Sa, S'a, Sb, S'b, Sc, and S'c in the inverter 420 perform the switching operation.

Figure 7A:
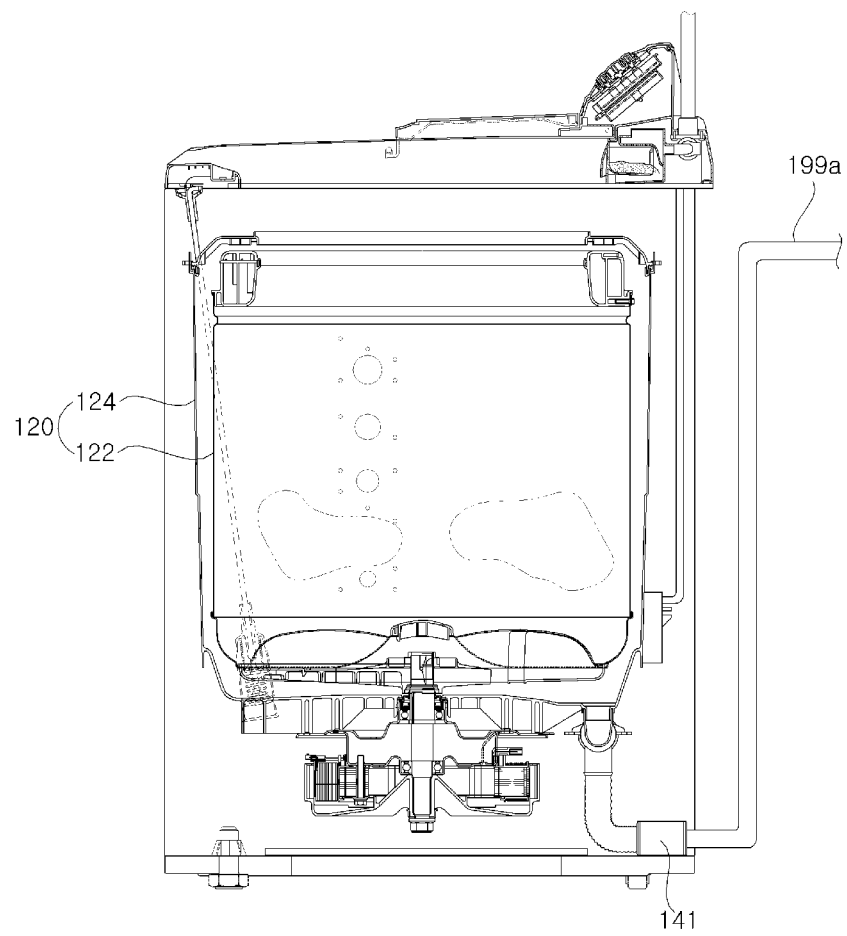
FIGS. 7A to 7B are views showing various examples of a drain pipe connected to the drain pump of the laundry treatment machine of FIG. 1.
Figure 7B:
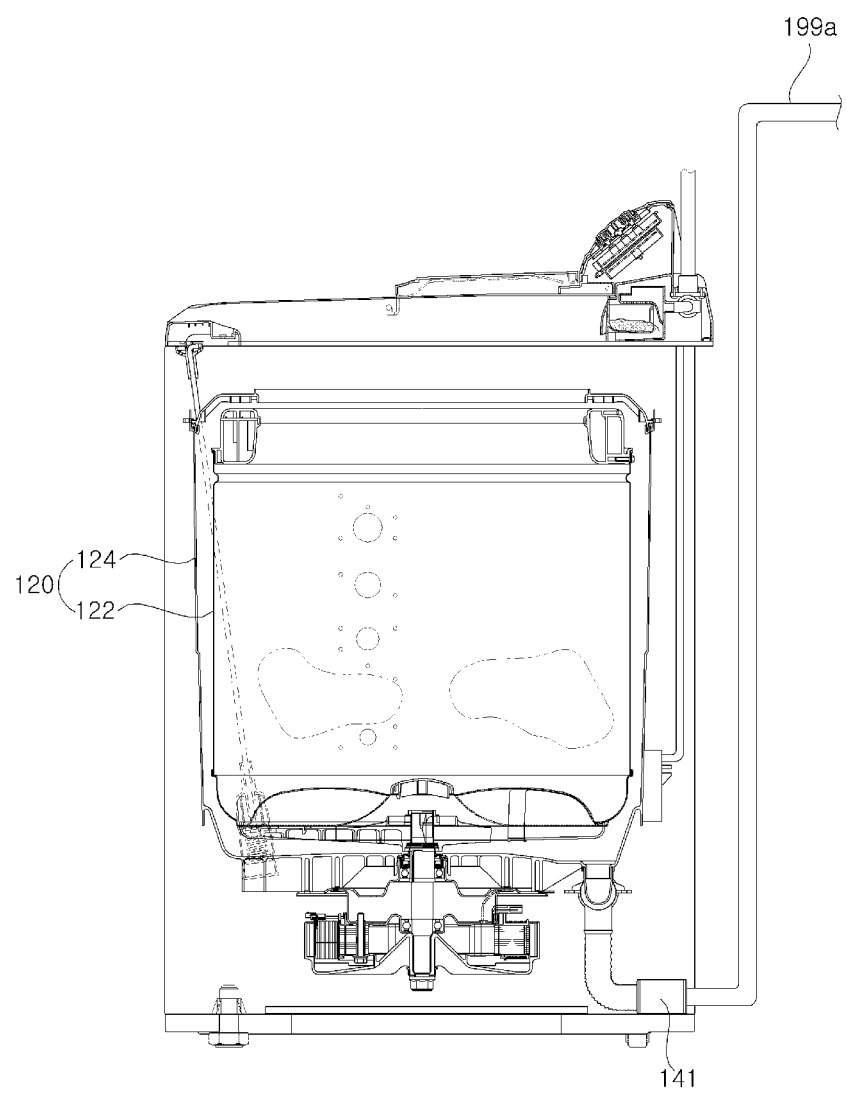

FIGS. 7A to 7B are views showing various examples of a drain pipe connected to the drain pump of the laundry treatment machine of FIG. 1.

FIG. 7A illustrates a case where the difference in height between the drain pump 141 and the drain pipe 199a is ha, and FIG. 7B illustrates a case where the difference in height between the drain pump 141 and the drain pipe 199a is hb, which is greater than ha.

For example, ha may be approximately 0.9 m and hb may be approximately 2.4 m.

If the laundry treatment machine 100 is installed in a basement, the drain pipe 199a should extend to the ground for draining, and therefore, as shown in FIGS. 7A and 7B, it should extend to a position substantially higher than the drain pump 141.

In this case, if the drain pump is implemented using a solenoid, drainage will not be performed smoothly due to the low pumping power.

Accordingly, a motor is preferably used to drive the drain pump. Conventionally, an AC motor has been employed and driven at a constant speed of approximately 3000 rpm or 3600 rpm using an AC power of 50 Hz or 60 Hz.

In this case, since the motor is driven at a constant speed irrespective of the height of the drain pump, noise is generated by movement of the residual water remaining in the drain pipe 199a.

It is assumed in the present invention that a motor 630 capable of varying the speed is used in order to solve the problem above.

That is, according to an embodiment of the present invention, the motor 63 for driving the drain pump 141 may include a brushless DC (BLDC) motor 630.

Further, in the present invention, a lift, which is a difference between the water level of a water introduction part through which water flows into the drain pump 141 and the water level of a water discharge part for discharging water from the drain pump 141 is calculated, and the rotational speed of the motor 630 is varied based on the calculated lift.

According to this configuration, the lift may be accurately calculated without using any water pressure sensor or water level sensor. Therefore, manufacturing costs may be reduced.

As the rotational speed of the motor 630 is controlled to be varied based on the calculated lift, drainage may be performed smoothly, and power consumption may be reduced.

Details will be described with reference to FIG. 8 and subsequent figures.

Figure 8:
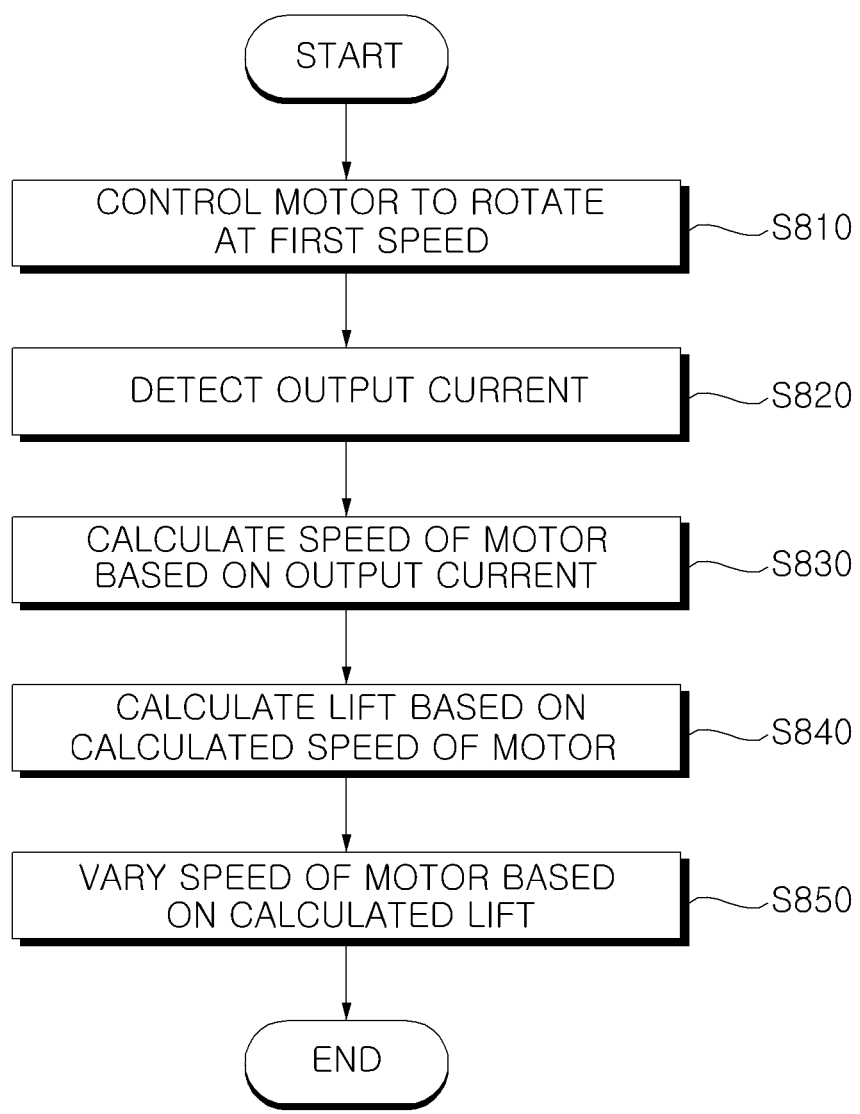
FIG. 8 is a flowchart showing an exemplary operation method for a drain pump driving apparatus according to an embodiment of the present invention.

FIG. 8 is a flowchart showing an operation method for a drain pump driving apparatus according to an embodiment of the present invention, and FIGS. 9A to 12 illustrate the operation method of FIG. 8.

Referring to FIG. 8, the inverter controller 430 of the drain pump driving apparatus or the controller 210 of the laundry treatment machine controls the motor 630 to rotate at a first speed (S810).

Next, the output current detector E of the drain pump driving unit 620 detects the output current Idc flowing through the motor 630 (S820).

Next, the inverter controller 430 of the drain pump driving apparatus or the controller 210 of the laundry treatment machine calculates the speed of the motor 630 based on the detected output current Idc (S830).

The inverter controller 430 of the drain pump driving apparatus may calculate the motor speed based on the detected output current Idc as described with reference to FIG. 6.

Next, the inverter controller 430 of the drain pump driving apparatus or the controller 210 of the laundry treatment machine calculates a lift based on the calculated motor speed (S840).

The inverter controller 430 of the drain pump driving apparatus or the controller 210 of the laundry treatment machine may calculate the lift, which is a difference between the water level of a water introduction part through which water flows into the drain pump 141 and the water level of a water discharge part for discharging water from the drain pump 141.

For example, the inverter controller 430 of the drain pump driving apparatus or the controller 210 of the laundry treatment machine may calculate the difference between the bottom surface of the washing tub 120 and the final height of the drain pipe 199a as the lift.

As another example, the inverter controller 430 of the drain pump driving apparatus or the controller 210 of the laundry treatment machine may calculate the difference between the position of the drain pump 141, which is lower than the bottom surface of the washing tub 120, and the final position of the drain pipe 199a as the lift.

The inverter controller 430 of the drain pump driving apparatus or the controller 210 of the laundry treatment machine may control the motor 630 to rotate at a first speed, and, in the case where rotation at the first speed is controlled, if the speed of the motor 630 calculated based on the output current Idc is a second speed, the lift may be calculated as a first level based on the second speed.

The inverter controller 430 of the drain pump driving apparatus or the controller 210 of the laundry treatment machine may control the motor 630 to rotate at a first speed, and, in the case where rotation at the first speed is controlled, if the speed of the motor 630 calculated based on the output current Idc is a third speed lower than the second speed, the lift may be calculated as a second level lower than the first level.

The inverter controller 430 of the drain pump driving apparatus or the controller 210 of the laundry treatment machine may calculate a lower level of the lift as the calculated speed of the motor 630 decreases.

Next, the inverter controller 430 of the drain pump driving apparatus or the controller 210 of the laundry treatment machine varies the motor speed based on the calculated lift (S850).

The inverter controller 430 of the drain pump driving apparatus or the controller 210 of the laundry treatment machine may control the rotational speed of the motor 630 to be varied based on the calculated lift such that the speed of the motor 630 decreases as the water level of the water introduction part is lowered.

Figure 9A:
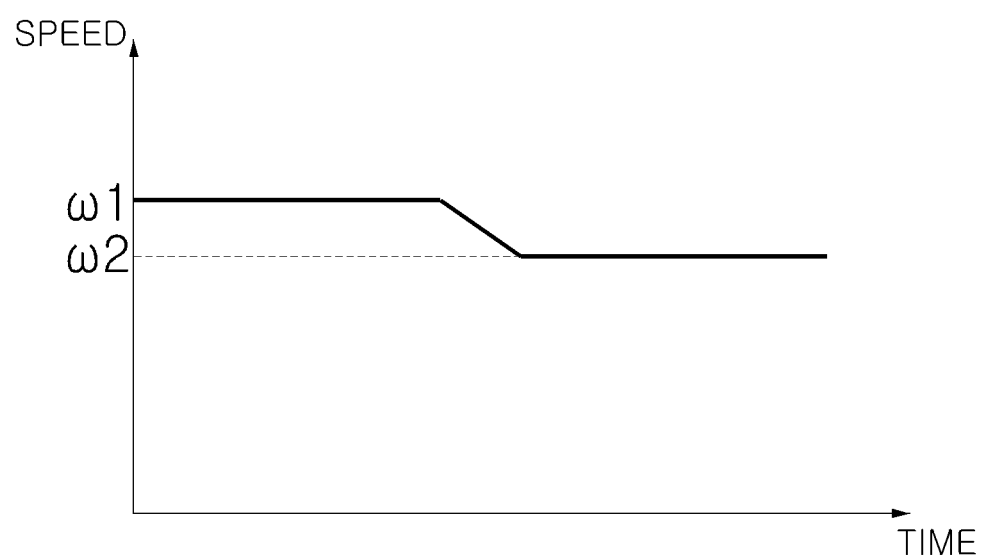
FIGS. 9A to 12 illustrate the operation method of FIG. 8.

FIG. 9A depicts a case where the motor 630 rotates at a speed of $\omega 1$ during the period Pa, and gradually slows down during the period Pb, which is a transition period, and then rotates at a speed of $\omega 2$ lower than $\omega 1$ during the period Pc.

The inverter controller 430 of the drain pump driving apparatus or the controller 210 of the laundry treatment machine controls the motor 630 to rotate at the actual speed command value $\omega 1$, and, if the speed of the motor 630 calculated based on the output current is $\omega 2$, the lift may be calculated based on the difference between $\omega 1$ and $\omega 2$.

Figure 9B:
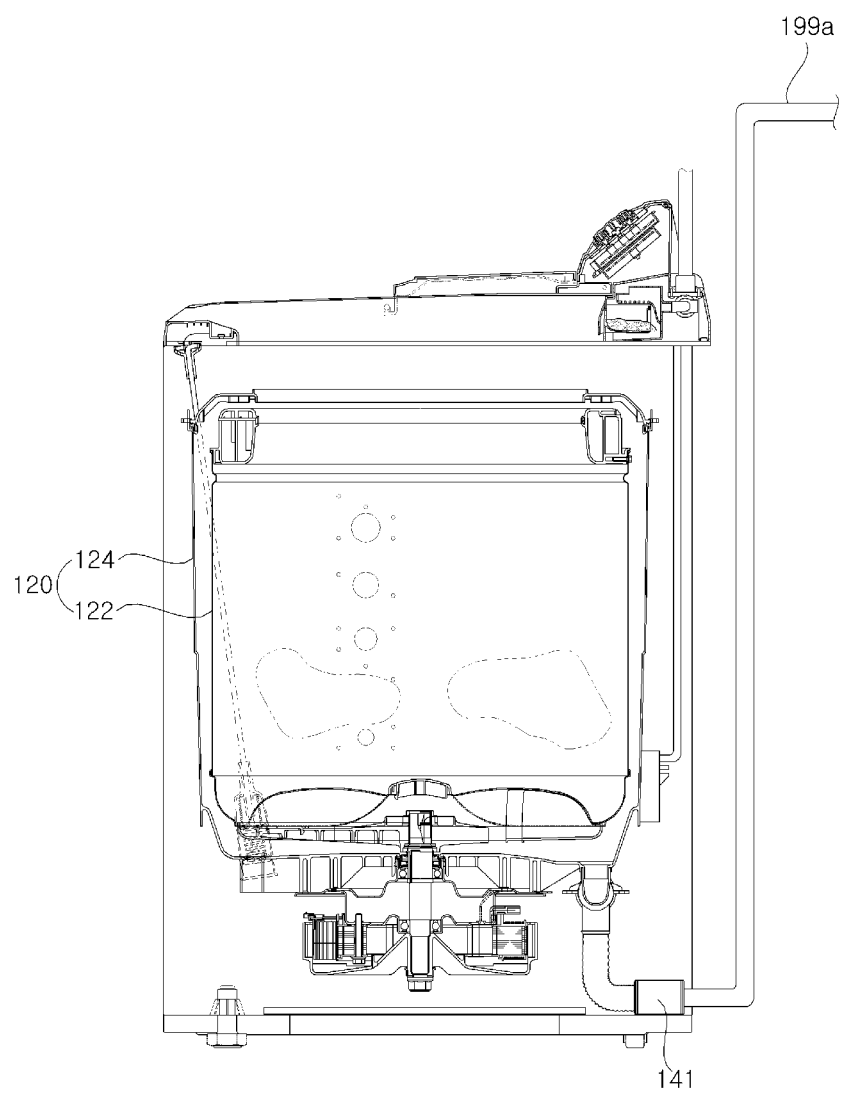

For example, as shown in FIG. 9B, the lift, which is the difference between the position of the drain pump 141 and the final height of the drain pipe 199a, may be calculated as hb.

The data on the lift for the speed difference may be a value preset by an experiment, and may be pre-stored in a lookup table or memory.

Figure 9C:
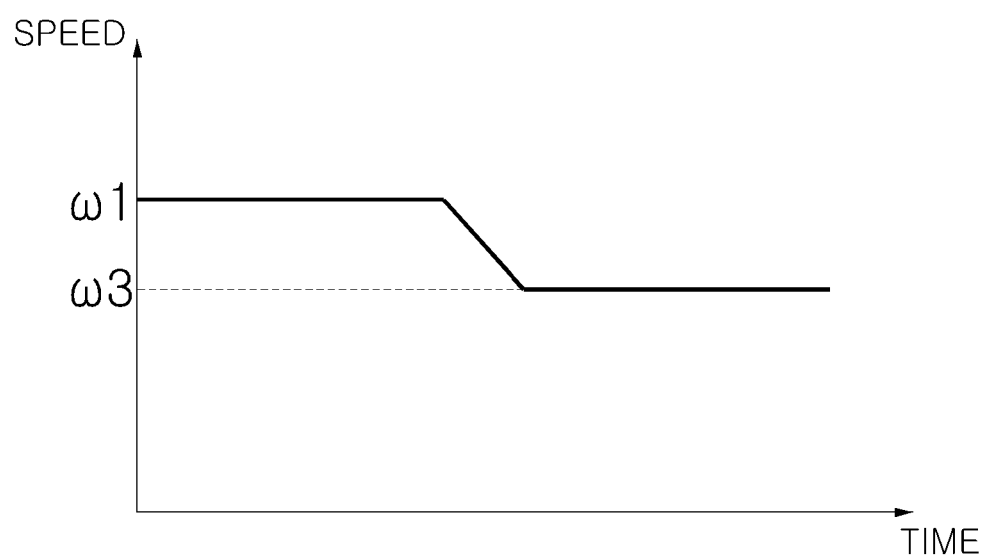

FIG. 9C depicts a case where the motor 630 rotates at a speed of $\omega 1$ during the period Pa, and gradually slows down during the period Pb, which is a transition period, and then rotates at a speed of $\omega 3$ lower than $\omega 1$ during the period Pc.

The inverter controller 430 of the drain pump driving apparatus or the controller 210 of the laundry treatment machine controls the motor 630 to rotate at the actual speed command value $\omega 1$. If the speed of the motor 630 calculated based on the output current is $\omega 3$, the lift may be calculated based on the difference between $\omega 1$ and $\omega 3$.

Here, $\omega 3$ may be less than $\omega 2$.

Figure 9D:
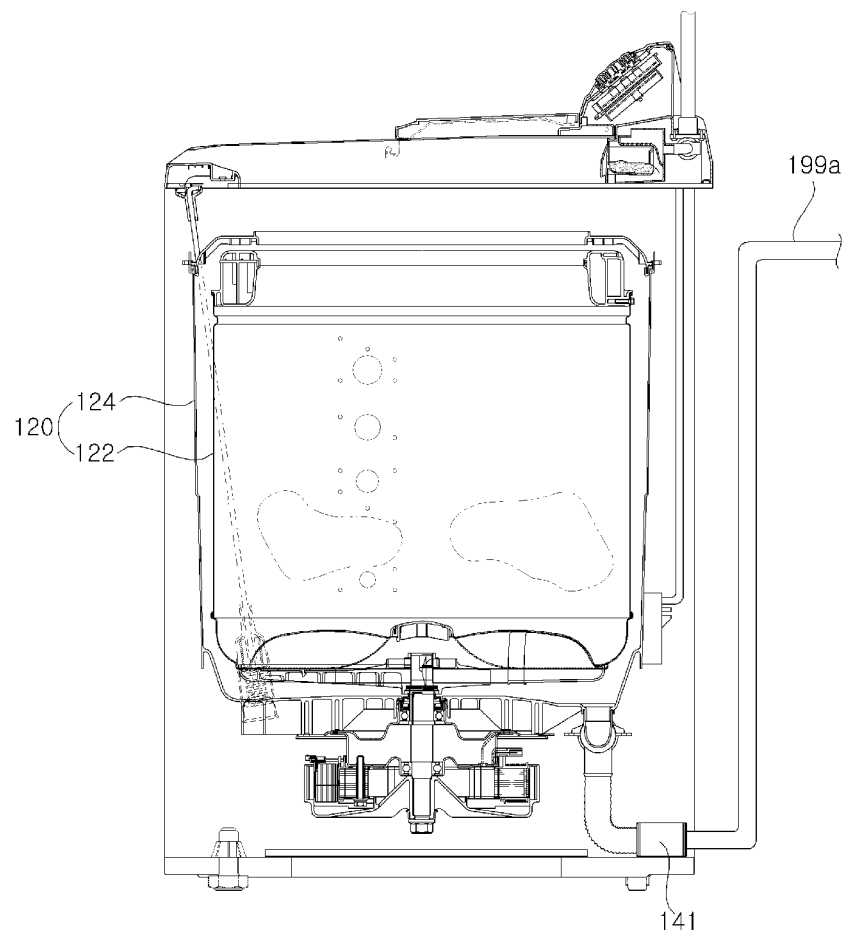

Accordingly, as shown in FIG. 9D, the lift, which is the difference between the position of the drain pump 141 and the final height of the drain pipe 199a, may be calculated as ha.

That is, the inverter controller 430 of the drain pump driving apparatus or the controller 210 of the laundry treatment machine may calculate a lower level of the lift as the calculated speed of the motor 630 decreases.

Since the level of the lift may be calculated on the basis of the speed of the motor 630 calculated based on the output current as described above, the lift may be accurately calculated without using any separate water pressure sensor or water level sensor.

Figure 10A:
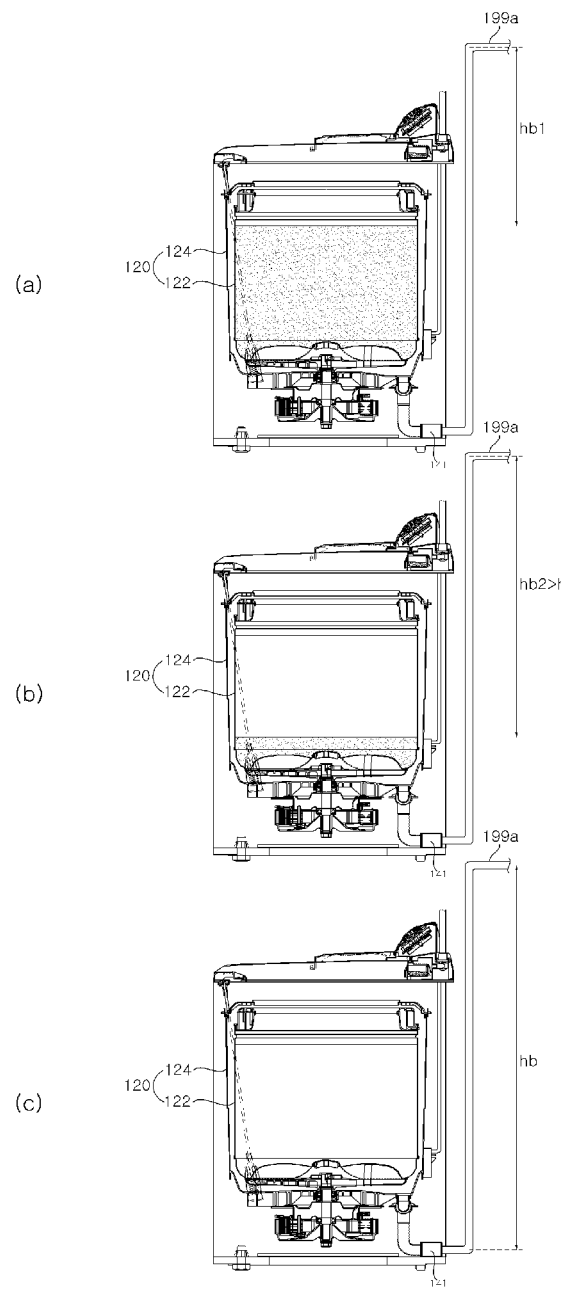

FIG. 10A illustrates that the water level in the washing tub 120 is sequentially lowered.

In particular, FIG. 10A corresponds to FIG. 7B in terms of the position of the drain pipe.

FIG. 10A(a) illustrates a case where the difference between the water level of the washing tub and the height of the drain pipe is hb1, FIG. 10A(b) illustrates a case where the difference between the water level of the washing tub and the height of the drain pipe is hb2, and FIG. 10A(c) illustrates a case where the water level of the washing tub is zero.

The inverter controller 430 of the drain pump driving apparatus or the controller 210 of the laundry treatment machine may control the rotational speed of the motor 630 to be varied based on the calculated lift such that the speed of the motor 630 decreases as the water level of the water introduction part is lowered, as described above.

Figure 10B:
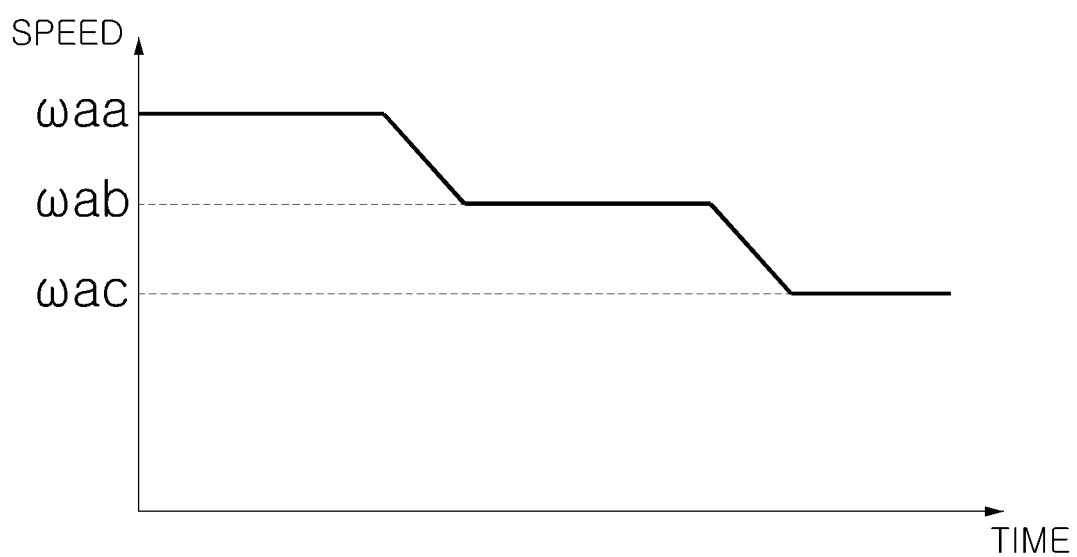

FIG. 10B illustrates an example in which the driving speed of the motor 630 decreases from ωaa to ωab to ωac when the water level of the washing tub is sequentially lowered as shown in FIG. 10A.

ωaa may correspond to hb1 which is the difference between the water level of the washing tub and the drain pipe 199$a$ in FIG. 10A(a), ωab may correspond to hb2 which is the difference between the water level of the washing tub and the drain pipe 199$a$ in FIG. 10A(b), and ωac may correspond to hb in FIG. 10A(c).

Figure 11A:
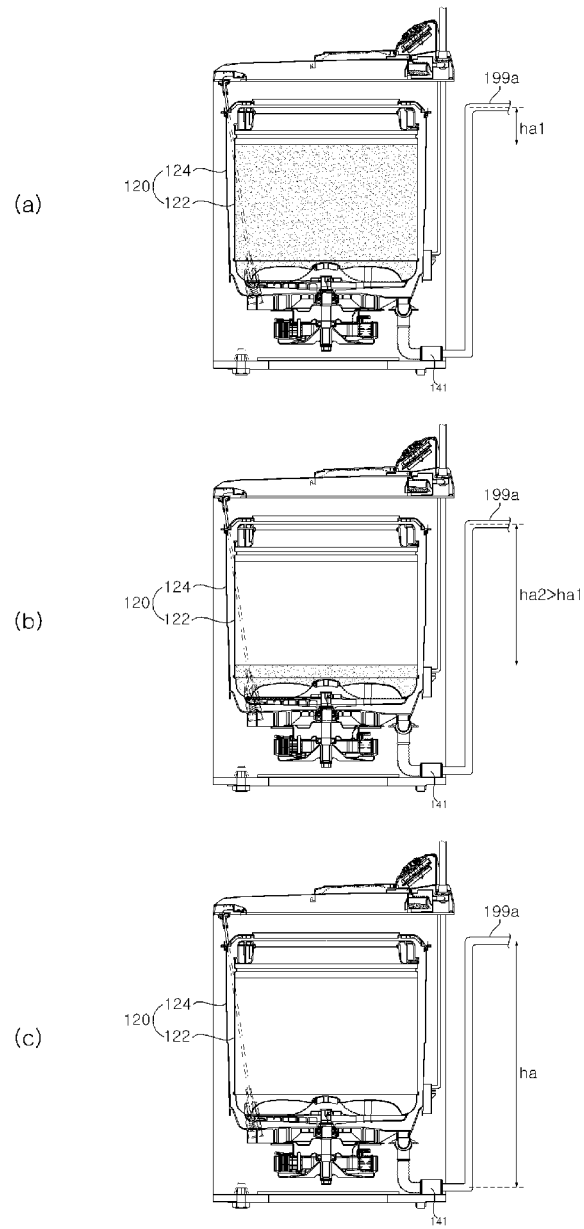

FIG. 11A illustrates that the water level in the washing tub 120 is sequentially lowered.

In particular, FIG. 11A corresponds to FIG. 7A in terms of the position of the drain pipe 199$a$.

FIG. 11A(a) illustrates a case where the difference between the water level of the washing tub and the height of the drain pipe 199$a$ is ha1, FIG. 11A(b) illustrates a case where the difference between the water level of the washing tub and the height of the drain pipe 199$a$ is ha2, and FIG. 11A(c) illustrates a case where the water level of the washing tub is zero.

The inverter controller 430 of the drain pump driving apparatus or the controller 210 of the laundry treatment machine may control the rotational speed of the motor 630 to be varied based on the calculated lift such that the speed of the motor 630 decreases as the water level of the water introduction part is lowered, as described above.

Figure 11B:
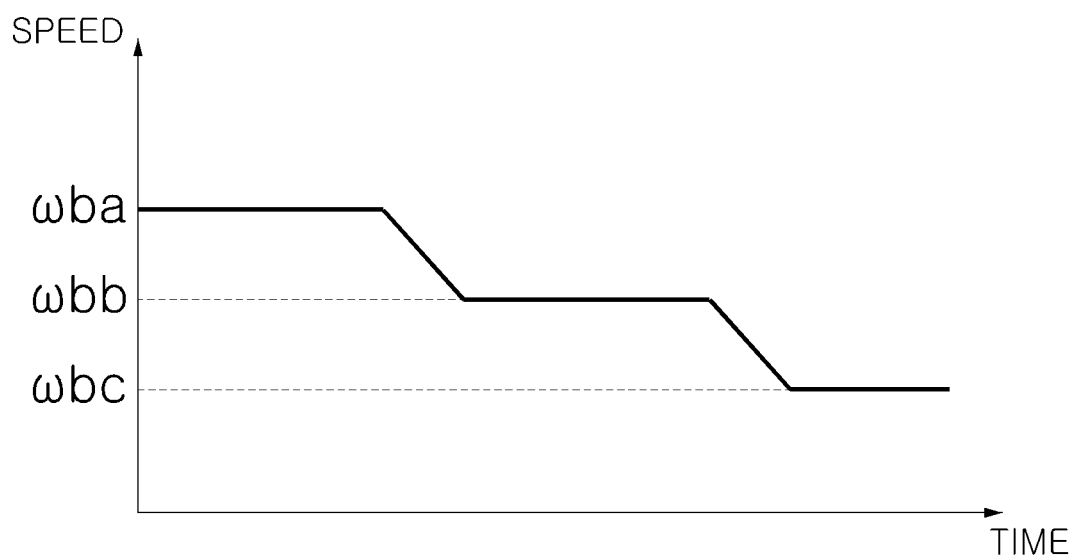

FIG. 11B illustrates an example in which the driving speed of the motor 630 decreases from ωba to ωbb to ωbc when the water level of the washing tub is sequentially lowered as shown in FIG. 11A.

ωba may correspond to ha1, which is the difference between the water level of the washing tub and the drain pipe 199$a$ in FIG. 11A(a), ωbb may correspond to ha2, which is the difference between the water level of the washing tub and the drain pipe 199$a$ in FIG. 11A(b), and ωbc may correspond to ha in FIG. 11A(c).

The value of ωba may be less than ωaa of FIG. 10B. That is, as the level of the lift is lowered, the speed of the motor 630 may decrease.

Figure 12:
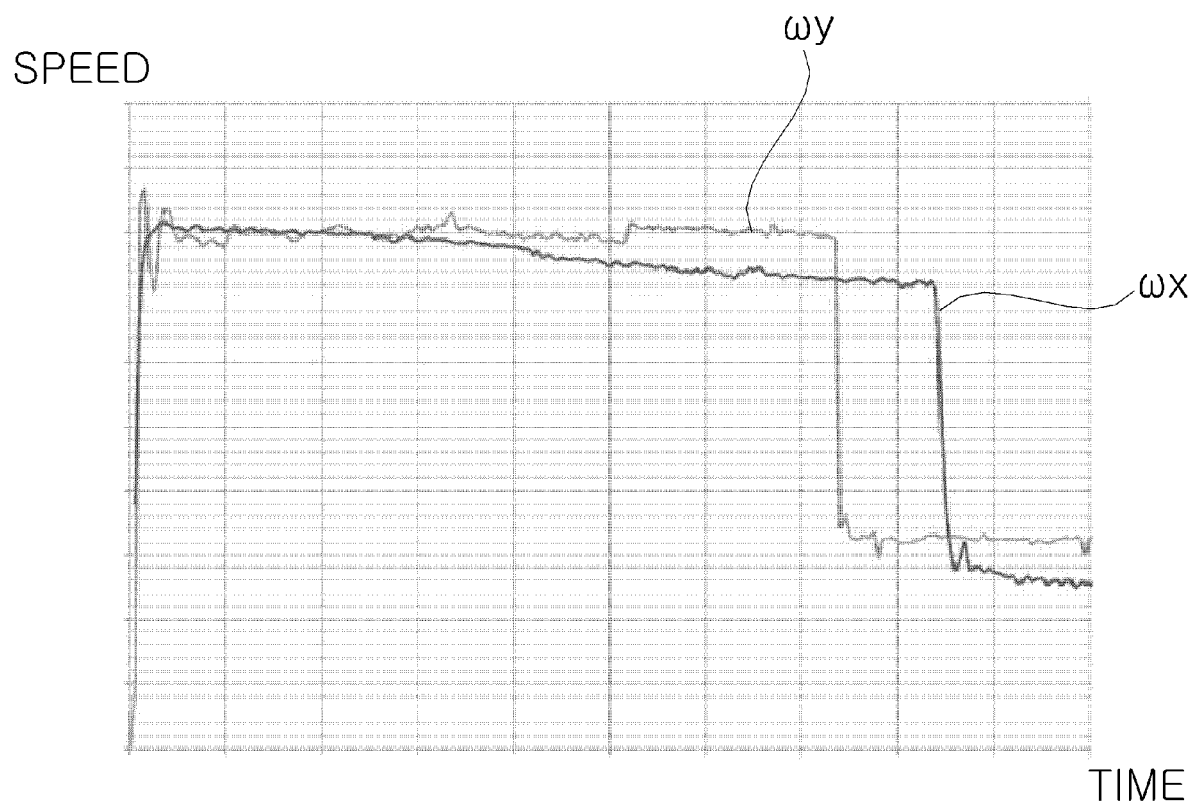

Meanwhile, FIG. 12 illustrates an example of a waveform obtained when a motor is driven by lift calculation and a waveform obtained when a motor is driven without lift calculation.

According to the motor speed waveform ωy obtained when the motor is driven by lift calculation, drainage is performed quickly compared to the motor speed waveform ωx obtained when the motor is driven without lift calculation, and thus, the motor is stopped earlier. Thereby, power consumption for driving the motor 630 may be reduced.

Meanwhile, FIGS. 8 to 12 illustrate a lift calculation method based on the output current, and, similarly, it is also possible to calculate the lift based on the power calculated in the power calculator of FIG. 6.

The inverter controller 430 of the drain pump driving apparatus or the controller 210 of the laundry treatment machine may calculate a lower level of the lift as the calculated power or load is lowered.

While FIG. 1 illustrates a top loading type machine as a laundry treatment machine, the drain pump driving apparatus according to an embodiment of the present invention may also be applied to a front-loading washing machine, that is, a drum type washing machine.

The drain pump driving apparatus and the laundry treatment machine having the same according to embodiments of the present invention are not limited to the configuration and method of the embodiments described above, and variations may be made to the embodiments described above by selectively combining all or some of the embodiments.

A method for operating the drain pump driving apparatus and the laundry treatment machine of the present invention is implementable by code readable a processor provided to each of the drain pump driving apparatus, on a recording medium readable by the processor. The recording medium readable by the processor includes all kinds of recording devices for storing data which may be read by the processor.

Although embodiments have been described with reference to a number of illustrative embodiments thereof, it should be understood that numerous other modifications and embodiments may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A drain pump driving apparatus comprising:
   a motor configured to drive a drain pump for drainage;
   an inverter to convert a direct current (DC) power to an alternating current (AC) power by a switching operation, and output the converted AC power to the motor;
   a DC terminal capacitor disposed at a DC terminal and configured to store the DC power;
   an output current detector configured to detect an output current flowing to the motor; and
   a controller configured to control the inverter,
   wherein the drain pump is connected to a drain pipe,
   wherein the controller is further configured to:
      control the motor to rotate at a first speed,
      when speed of the motor is a second speed after rotating the motor at the first speed, calculate a lift as a first level based on the second speed, control the motor to rotate at a third speed based on the first level of the lift, wherein the lift is a difference between a water level of a water introduction part through which water flows into the drain pump and a water level of a water discharge part for discharging water from the drain pump, when the speed of the motor is a fourth speed lower than the second speed after rotating the motor at the first speed, calculate the lift as a second level less than the first level based on the third speed, control the motor to rotate at a fifth speed lower than the third speed based on the second level of the lift, wherein a first timing for stopping the motor when the drainage is completed based on the first level of the lift is faster than a second timing for stopping the motor when the drainage is completed without being based on the first level of the lift, wherein the controller is configured to calculate a level of the lift based on the speed of the motor without a sensing data from a water pressure sensor or a water level sensor, wherein the output current detector is disposed between the DC terminal capacitor and the inverter, and the output current detector is configured to detect a current which corresponds to the output current flowing to the motor in time division manner when one lower switching device, from among a plurality of upper switching devices and a plurality of lower switching devices of the inverter, is turned on, wherein the controller is configured to control the inverter based on the detected current.

2. The drain pump driving apparatus of claim 1, wherein the controller is further configured to calculate a lower level of the lift as the speed of the motor decreases after rotating the motor at the first speed.

3. The drain pump driving apparatus of claim 1, wherein the controller is further configured to control the rotational speed of the motor to be varied based on the calculated level of the lift such that the speed of the motor decreases as the water level of the water introduction part is lowered.

4. The drain pump driving apparatus of claim 1, wherein the motor comprises a brushless DC (BLDC) motor.

5. The drain pump driving apparatus of claim 1, wherein the controller comprises:
 a power calculator to calculate a power or a load of the motor based on the output current;
 a speed command generator to generate a speed command value based on the calculated power;
 a current command generator to generate a current command value based on the speed command value and the speed of the motor;
 a voltage command generator to generate a voltage command value based on the current command value and the output current; and
 a switching control signal output unit to output a switching control signal based on the voltage command value, the switching control signal for controlling driving of the inverter.

6. The drain pump driving apparatus of claim 5, wherein the controller further comprises a speed calculator to calculate the speed of the motor based on the output current.

7. A laundry treatment machine comprising:
 a washing tub;
 a driving unit to drive the washing tub;
 a drain pump; and
 a drain pump driving apparatus to drive the drain pump, wherein the drain pump driving apparatus comprises:
  a motor configured to drive the drain pump for drainage;
  an inverter to convert a direct current (DC) power to an alternating current (AC) power by a switching operation, and output the converted AC power to the motor;
  a DC terminal capacitor disposed at a DC terminal and configured to store the DC power;
  an output current detector configured to detect an output current flowing to the motor; and
  a controller configured to control the inverter, wherein the drain pump is connected to a drain pipe,
 wherein the controller is further configured to:
  control the motor to rotate at a first speed,
  when speed of the motor is a second speed after rotating the motor at the first speed, calculate a lift as a first level based on the second speed, control the motor to rotate at a third speed based on the first level of the lift, wherein the lift is a difference between a water level of a water introduction part through which water flows into the drain pump and a water level of a water discharge part for discharging water from the drain pump,
  when the speed of the motor is a fourth speed lower than the second speed after rotating the motor at the first speed, calculate the lift as a second level less than the first level based on the third speed, control the motor to rotate at a fifth speed lower than the third speed based on the second level of the lift,
  wherein a first timing for stopping the motor when the drainage is completed based on the first level of the lift is faster than a second timing for stopping the motor when the drainage is completed without being based on the first level of the lift,
  wherein the controller is configured to calculate a level of the lift based on the speed of the motor without a sensing data from a water pressure sensor or a water level sensor,
  wherein the output current detector is disposed between the DC terminal capacitor and the inverter, and the output current detector is configured to detect a current which corresponds to the output current flowing to the motor in time division manner when one lower switching device, from among a plurality of upper switching devices and a plurality of lower switching devices of the inverter, is turned on,
  wherein the controller is configured to control the inverter based on the detected current.

8. The laundry treatment machine of claim 7, wherein the controller is further configured to calculate a lower level of the lift as the speed of the motor decreases after rotating the motor at the first speed.

9. The laundry treatment machine of claim 7, wherein the controller is further configured to control a rotational speed of the motor to be varied based on the first level of the lift such that the speed of the motor decreases as the water level of the water introduction part is lowered.

10. The laundry treatment machine of claim 7, wherein the motor comprises a brushless DC (BLDC) motor.

11. The laundry treatment machine of claim 7, wherein the controller comprises:
 a power calculator to calculate a power or a load of the motor based on the output current;
 a speed command generator to generate a speed command value based on the calculated power;

a current command generator to generate a current command value based on the speed command value and the speed of the motor;

a voltage command generator to generate a voltage command value based on the current command value and the output current; and a switching control signal output unit to output a switching control signal based on the voltage command value, the switching control signal for controlling driving of the inverter.

12. The laundry treatment machine of claim 11, wherein the controller further comprises a speed calculator to calculate the speed of the motor based on the output current.

* * * * *